United States Patent
Guday et al.

(10) Patent No.: US 10,356,549 B2
(45) Date of Patent: **\*Jul. 16, 2019**

(54) WI-FI TILE TRANSFER

(71) Applicant: Microsoft Technology Licensing, LLC, Redmond, WA (US)

(72) Inventors: Shai Guday, Redmond, WA (US); Maher Afif Saba, Seattle, WA (US)

(73) Assignee: Microsoft Technology Licensing, LLC, Redmond, WA (US)

( \* ) Notice: Subject to any disclaimer, the term of this patent is extended or adjusted under 35 U.S.C. 154(b) by 51 days.

This patent is subject to a terminal disclaimer.

(21) Appl. No.: 15/596,298

(22) Filed: May 16, 2017

(65) Prior Publication Data

US 2017/0251333 A1    Aug. 31, 2017

Related U.S. Application Data

(63) Continuation of application No. 15/007,839, filed on Jan. 27, 2016, now Pat. No. 9,686,693, which is a
(Continued)

(51) Int. Cl.
*H04W 4/021* (2018.01)
*H04W 4/02* (2018.01)
(Continued)

(52) U.S. Cl.
CPC ............ *H04W 4/021* (2013.01); *H04L 67/20* (2013.01); *H04W 4/023* (2013.01); *H04W 16/24* (2013.01);
(Continued)

(58) Field of Classification Search
CPC ...... H04L 67/20; H04W 16/24; H04W 48/00; H04W 48/04; H04W 48/08; H04W 4/021; H04W 4/023; H04W 76/10; H04W 84/12
See application file for complete search history.

(56) References Cited

U.S. PATENT DOCUMENTS

| 7,315,259 B2 | 1/2008 | Sacks |
| 8,103,441 B2 | 1/2012 | Callaghan et al. |

(Continued)

FOREIGN PATENT DOCUMENTS

| WO | 2004086681 A2 | 10/2004 |
| WO | 2009029157 A1 | 3/2009 |

OTHER PUBLICATIONS

Urda, et al., "Storing Location-Aware Data in Mobile Distributed Systems", Retrieved at <<http://cipsm.hpc.pub.ro/Joomla/articles/2013_11.pdf>>, In Proceedings of the 12th International Symposium on Parallel and Distributed Computing, Jun. 27, 2013, 8 pages.
(Continued)

*Primary Examiner* — Stephen J Clawson
(74) *Attorney, Agent, or Firm* — Medley, Behrens & Lewis, LLC

(57) ABSTRACT

Various technologies described herein pertain to transferring geospatial tiles for Wi-Fi networks. A geospatial tile specifies a geographic region and includes data pertaining to a plurality of Wi-Fi networks having respective geographic coverage areas within the geographic region. A mobile device can receive an indicator that corresponds to a geospatial tile for retrieval by the mobile device. Further, the mobile device can request the geospatial tile from a tile management system based upon the indicator. Upon receiving the geospatial tile from the tile management system, the mobile device stores the geospatial tile in a tile cache. Further, the mobile device can automatically connect to a particular Wi-Fi network from the plurality of Wi-Fi networks utilizing data for the particular Wi-Fi network included in the geospatial tile when the mobile device is positioned within a geographic coverage area of the particular Wi-Fi network.

20 Claims, 12 Drawing Sheets

Related U.S. Application Data continuation of application No. 14/221,213, filed on Mar. 20, 2014, now Pat. No. 9,686,692.

(51) Int. Cl.

| | |
|---|---|
| *H04W 48/00* | (2009.01) |
| *H04L 29/08* | (2006.01) |
| *H04W 16/24* | (2009.01) |
| *H04W 76/10* | (2018.01) |
| *H04W 48/04* | (2009.01) |
| *H04W 48/08* | (2009.01) |
| *H04W 84/12* | (2009.01) |

(52) U.S. Cl.
CPC ........... *H04W 48/00* (2013.01); *H04W 48/04* (2013.01); *H04W 48/08* (2013.01); *H04W 76/10* (2018.02); *H04W 84/12* (2013.01)

(56) References Cited

U.S. PATENT DOCUMENTS

| | | | |
|---|---|---|---|
| 8,150,367 B1 | 4/2012 | Malladi et al. | |
| 8,369,264 B2 | 2/2013 | Brachet et al. | |
| 2002/0087624 A1* | 7/2002 | Liebenow | G06F 17/30902 709/203 |
| 2002/0141547 A1 | 10/2002 | Odinak et al. | |
| 2003/0018818 A1 | 1/2003 | Boliek et al. | |
| 2004/0039817 A1* | 2/2004 | Lee | H04W 24/00 709/225 |
| 2005/0091357 A1 | 4/2005 | Krantz et al. | |
| 2005/0107038 A1* | 5/2005 | Coutts | H04W 48/18 455/41.2 |
| 2006/0251034 A1 | 11/2006 | Park | |
| 2007/0013708 A1 | 1/2007 | Barcklay et al. | |
| 2008/0238941 A1* | 10/2008 | Kinnan | G09B 29/007 345/630 |
| 2009/0117921 A1 | 5/2009 | Beydler et al. | |
| 2009/0326810 A1 | 12/2009 | Callaghan et al. | |
| 2010/0109868 A1 | 5/2010 | Berger et al. | |
| 2011/0191332 A1 | 8/2011 | Barve et al. | |
| 2011/0195727 A1 | 8/2011 | Proulx et al. | |
| 2012/0072853 A1* | 3/2012 | Krigstrom | G06F 3/0486 715/748 |
| 2012/0209934 A1 | 8/2012 | Smedman | |
| 2012/0238287 A1 | 9/2012 | Scherzer | |
| 2012/0254804 A1 | 10/2012 | Sheha et al. | |
| 2012/0317205 A1 | 12/2012 | Lahiani et al. | |
| 2013/0151645 A1 | 6/2013 | Siliski et al. | |
| 2013/0196615 A1 | 8/2013 | Zalmanovitch et al. | |
| 2013/0227431 A1 | 8/2013 | Vasudevan et al. | |
| 2013/0250851 A1 | 9/2013 | Lakhzouri et al. | |
| 2013/0295962 A1 | 11/2013 | Manroa et al. | |
| 2013/0325317 A1 | 12/2013 | Pylappan et al. | |
| 2013/0328862 A1 | 12/2013 | Piemonte | |
| 2013/0331100 A1 | 12/2013 | Jamadagni et al. | |
| 2014/0026192 A1 | 1/2014 | Gatewood et al. | |
| 2014/0033288 A1* | 1/2014 | Wynn | H04W 12/08 726/7 |
| 2014/0141803 A1 | 5/2014 | Marti et al. | |
| 2015/0124791 A1 | 5/2015 | Mazandarany et al. | |
| 2015/0271640 A1 | 9/2015 | Guday et al. | |
| 2016/0142921 A1 | 5/2016 | Guday et al. | |

OTHER PUBLICATIONS

"Connection Tiles", Retrieved at <<http://www.windowsphone.com/en-us/store/app/connection-tiles/44438c2c-cfad-4cfd-8152-e2ed54847aad>>, Feb. 18, 2013, 2 pages.

"International Search Report and Written Opinion for PCT Patent Application No. PCT/US2015/021119", dated Jun. 16, 2015, 13 Pages.

"Response to the International Search Report and Written Opinion for PCT Patent Application No. PCT/US2015/021119", dated Aug. 27, 2015, 13 Pages.

"Notice of Allowance and Fees Due for U.S. Appl. No. 14/221,213", dated Nov. 30, 2015, 12 pages.

"Response to the Office Action for U.S. Appl. No. 14/221,213", filed Nov. 6, 2016, 15 pages.

"International Preliminary Report on Patentability", dated Jul. 5, 2016, 16 pages.

"Non-Final Office Action Issued in U.S. Appl. No. 14/221,213", dated May 19, 2016, 20 Pages.

"Written Opinion for PCT Patent Application No. PCT/US2015/021119", dated Feb. 4, 2016, 7 pages.

"Final Office Action Issued in U.S. Appl. No. 14/221,213", dated Jan. 11, 2017, 23 Pages.

"Non-Final Office Action Issued in U.S. Appl. No. 15/007839", dated Aug. 16, 2016, 33 Pages.

"Response to the Office Action for U.S. Appl. No. 15/007,839", filed Nov. 6, 2016, 17 pages.

"Final Office Action Issued in U.S. Appl. No. 15/007,839", dated Nov. 30, 2016, 39 Pages.

"Notice of Allowance and Fees Due for U.S. Appl. No. 14/221,213", dated Mar. 16, 2017, 8 pages.

"Notice of Allowance and Fees Due for U.S. Appl. No. 15/007,839", dated Mar. 28, 2017, 8 pages.

"Response to the Final Office Action for U.S. Appl. No. 15/007,839", filed Feb. 23, 2017, 12 pages.

"Response to the Final Office Action for U.S. Appl. No. 14/221,213", filed Feb. 23, 2017, 11 pages.

\* cited by examiner

US 10,356,549 B2

WI-FI TILE TRANSFER

RELATED APPLICATION

This application is a continuation of U.S. patent application Ser. No. 15/007,839, filed on Jan. 27, 2016, and entitled "WI-FI TILE TRANSFER", which is a continuation of U.S. patent application Ser. No. 14/221,213, filed on Mar. 20, 2014, and entitled "WI-FI TILE TRANSFER". The entireties of these applications are incorporated herein by reference.

BACKGROUND

Wireless fidelity (Wi-Fi) networks have generally increased in popularity. By way of example, Wi-Fi networks have become more prevalent in homes, businesses, public areas, and so forth. A computing device, for instance, can connect to and exchange data via a Wi-Fi network. When connected to the Wi-Fi network, the computing device may use and/or access various network resources made available on the Wi-Fi network, such as the Internet, network attached storage, printers, other computing devices on the Wi-Fi network, and so forth.

Some Wi-Fi networks are made available to members of the public. Other Wi-Fi networks are gated and require user intervention for connecting to the Internet or other network resources. For example, a user may be required to accept terms and conditions, provide an e-mail address or hotel room number, or the like to access such Wi-Fi networks. Some existing solutions attempt to help the user connect to such networks by managing multiple passwords with a single authentication personal identification number (PIN). Other traditional techniques attempt to locate Wi-Fi networks near the user. However, conventional approaches oftentimes lack a seamless auto-connect experience.

SUMMARY

Described herein are various technologies that pertain to transferring geospatial tiles for Wi-Fi networks. A geospatial tile specifies a geographic region. Moreover, the geospatial tile includes data pertaining to a plurality of Wi-Fi networks having respective geographic coverage areas within the geographic region specified in the geospatial tile. For each of the plurality of Wi-Fi networks, the data of the geospatial tile can include a service set identifier (SSID) for a Wi-Fi network, a basic service set identification (BSSID) for the Wi-Fi network, and configuration information for automatically connecting a mobile device to the Wi-Fi network. The geospatial tile, for instance, can include data pertaining to open, curated networks and/or captive portal networks. Additionally or alternatively, it is contemplated that the geospatial tile can include data pertaining to shared Wi-Fi networks.

In accordance with various embodiments, a mobile device can receive an indicator that corresponds to a geospatial tile for retrieval by the mobile device. Examples of the indicator include geographic location information specified by user input, geographic location information detected from a future calendar item, a pointer to the geospatial tile (e.g., a calendar item can include the pointer to the geospatial tile), a notification concerning an event accepted through a third party service, a location beacon (e.g., a Bluetooth low energy (LE) location beacon provided according to a location and navigation profile), and so forth. Further, the geospatial tile can be requested by the mobile device from a tile management system based upon the indicator. The mobile device can receive the geospatial tile from the tile management system and can store the geospatial tile in a tile cache of the mobile device. Moreover, the mobile device can automatically connect to a particular Wi-Fi network from the plurality of Wi-Fi networks utilizing the data for the particular Wi-Fi network included in the geospatial tile stored in the tile cache when the mobile device is positioned within a geographic coverage area of the particular Wi-Fi network.

According to various embodiments, the mobile device can receive the geospatial tile when positioned at a geographic location that is outside of the geographic region specified in the geospatial tile. The geospatial tile can be stored in the tile cache of the mobile device. By way of example, the mobile device can receive user input that inhibits the geospatial tile from being managed out of the tile cache of the mobile device. Following this example, based upon such user input, the geospatial tile can continue to be maintained in the tile cache. Further, the mobile device can automatically connect to the particular Wi-Fi network from the plurality of Wi-Fi networks utilizing the data for the particular Wi-Fi network included in the geospatial tile stored in the tile cache when the mobile device is positioned within a geographic coverage area of the particular Wi-Fi network.

Moreover, in accordance with various embodiments, the tile management system can include a data repository that retains the geospatial tile (as well as disparate geospatial tiles). The tile management system can receive a request for delivery of the geospatial tile to the mobile device. Responsive to the request, the tile management system can send the geospatial tile to the mobile device. In accordance with an example, the request can be received from the mobile device. Pursuant to an illustration, a client application (e.g., a client application for a third party service, a location aware application, etc.) residing on the mobile device can send the request to the tile management system. By way of yet another example, the request can be received from a third party service. Following this example, the request can be sent by the third party service responsive to acceptance of an event through the third party service.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
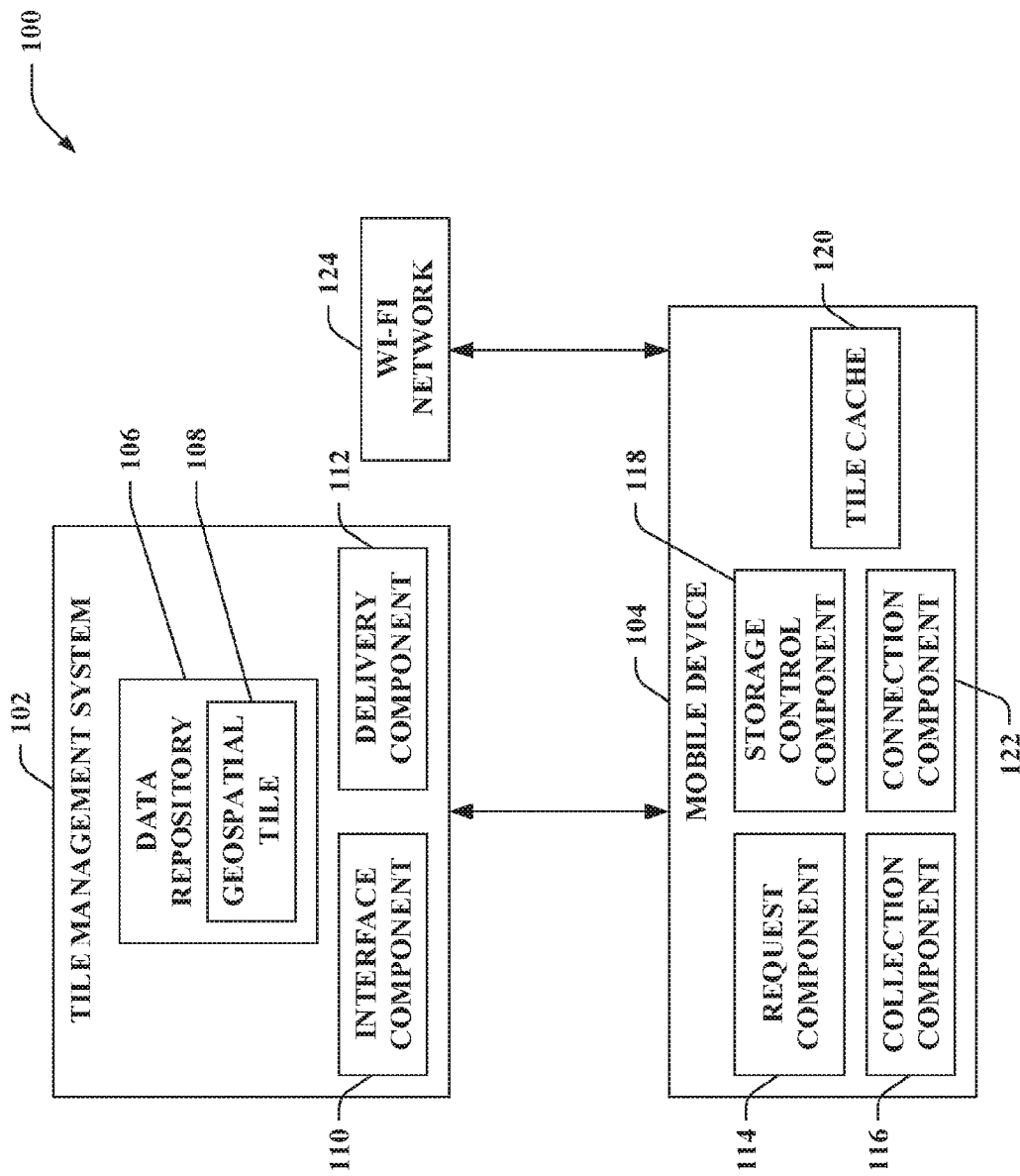
FIG. 1 illustrates a functional block diagram of an exemplary system that transfers geospatial tiles for Wi-Fi networks from a tile management system to a mobile device.

Various technologies pertaining to sharing a geospatial tile for Wi-Fi networks are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Referring now to the drawings, FIG. 1 illustrates a system 100 that transfers geospatial tiles for Wi-Fi networks from a tile management system 102 to a mobile device 104. The mobile device 104, for example, can be a mobile phone (e.g., smartphone), a tablet computer, a handheld computer, a laptop computer, a wearable computer, a personal digital assistant (PDA), a portable gaming device, an in-vehicle communications and infotainment system, or the like. The tile management system 102 includes a data repository 106 that retains geospatial tiles corresponding to respective geographic regions (e.g., the geospatial tiles specify respective corresponding geographic regions). As illustrated, the data repository 106 retains a geospatial tile 108 that specifies a particular geographic region (e.g., the geospatial tile 108 includes data that defines the particular geographic region). While not shown, it is to be appreciated that the data repository 106 additionally retains disparate geospatial tiles that can be substantially similar to the geospatial tile 108.

The geospatial tile 108 includes data pertaining to a plurality of Wi-Fi networks having respective geographic coverage areas within the geographic region corresponding to the geospatial tile 108. The data of the geospatial tile 108 can include a service set identifier (SSID) for a Wi-Fi network, a basic service set identification (BSSID) for the Wi-Fi network, and configuration information for automatically connecting to the Wi-Fi network for each of the plurality of Wi-Fi networks having respective geographic coverage areas within the geographic region specified in the geospatial tile 108. The geospatial tile 108 can also include location information describing the respective geographic coverage areas of the plurality of Wi-Fi networks. According to an example, the geospatial tile 108 can additionally include connection quality data for each of the Wi-Fi networks describing an anticipated, expected and/or predicted experience when transmitting and/or receiving data over such the Wi-Fi networks.

According to various embodiments, the geospatial tile 108 can include data pertaining to open, curated networks and captive portal networks (e.g., the plurality of Wi-Fi networks can include open, curated networks, and captive portal networks). Pursuant to an example where the plurality of Wi-Fi networks includes captive portal networks, the data of the geospatial tile 108 can include sequenced instruction sets for respectively connecting (e.g., the mobile device 104, disparate mobile device(s)) to each of the captive portal networks. Moreover, it is contemplated that the geospatial tile 108 can include data pertaining to shared Wi-Fi networks shared by friends of a user of the mobile device 104; however, the claimed subject matter is not so limited.

Figure 7:
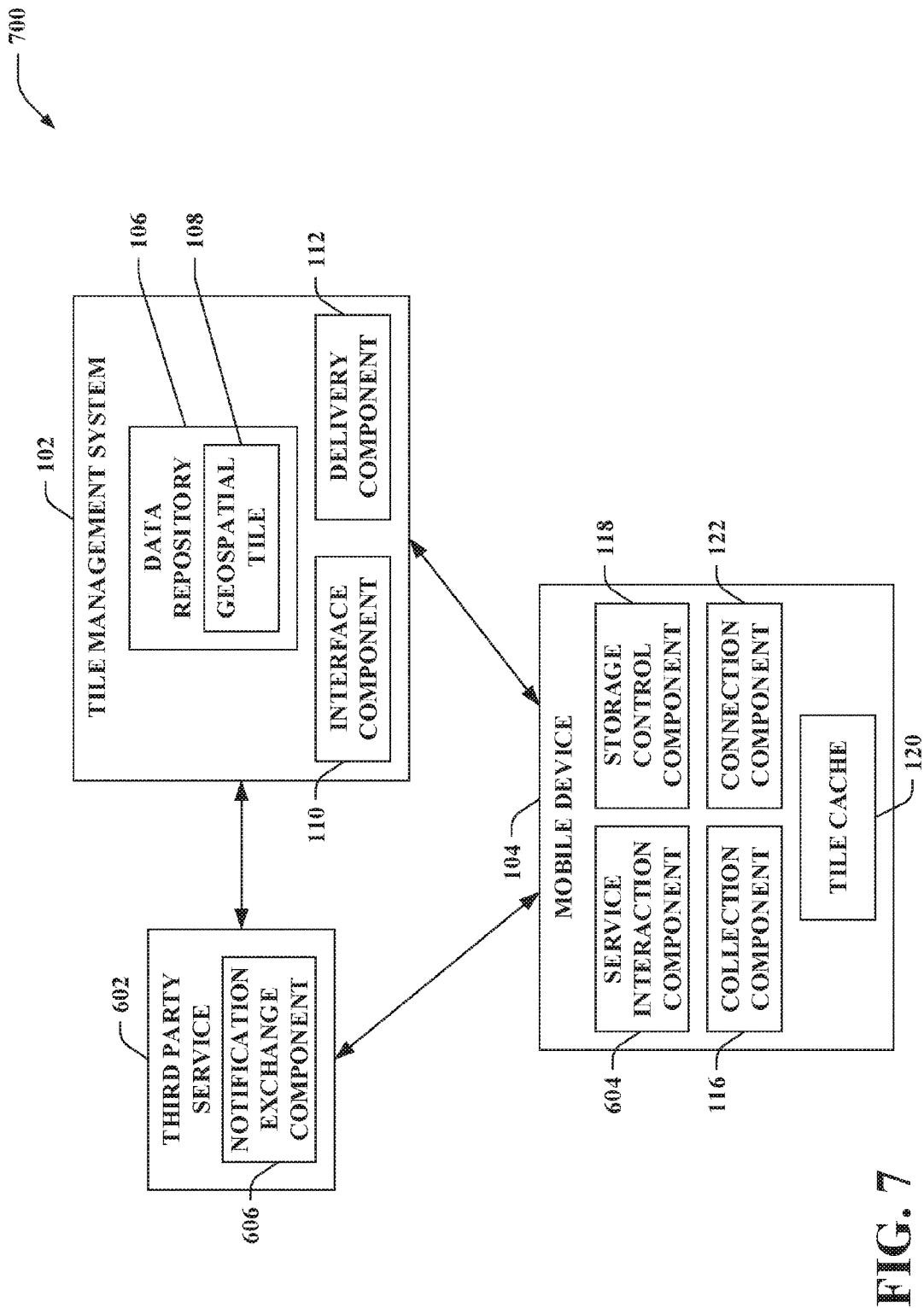
FIG. 7 illustrates a functional block diagram of an exemplary system that employs notifications from the third party service to cause a geospatial tile to be sent to the mobile device from the tile management system.

The tile management system 102 further includes an interface component 110 that can receive a request for delivery of the geospatial tile 108 to a mobile device (e.g., request for delivery of the geospatial tile 108 to the mobile device 104). According to an example, the interface component 110 can receive the request from the mobile device 104. By way of yet another example, the interface component 110 can receive the request from a third party service (as shown in FIG. 7). Following this example, the third party service can send the request responsive to acceptance of an event through the third party service; yet, the claimed subject matter is not so limited. Pursuant to yet a further example, the interface component 110 can receive the request for delivery of the geospatial tile 108 to the mobile device 104 from a disparate mobile device (e.g., responsive to a physical gesture between the mobile device 104 and the disparate mobile device).

Moreover, the tile management system 102 includes a delivery component 112 that sends the geospatial tile 108 to the mobile device 104 responsive to receipt of the request via the interface component 110. For instance, the delivery component 112 can identify (e.g., based upon geographic location information specified in the request, a pointer to the geospatial tile 108, etc.) and retrieve the geospatial tile 108 requested for delivery to the mobile device 104 from the data repository 106.

The mobile device 104 can include a request component 114 that can request the geospatial tile 108 from the tile management system 102. According to an example, the request component 114 can receive an indicator that corresponds to the geospatial tile for retrieval by the mobile device 104. Examples of the indicator include geographic location information specified by user input, geographic location information detected from a future calendar item, a pointer to the geospatial tile 108 (e.g., a calendar item can include the pointer to the geospatial tile 108), a notification concerning an event accepted through a third party service, a location beacon (e.g., a Bluetooth low energy (LE) location beacon provided according to a location and navigation profile), and so forth. Accordingly, the request component 114 can request the geospatial tile 108 from the tile management system 102 based upon the indicator. Yet, it is contemplated that in some embodiments the mobile device 104 need not request the geospatial tile 108 from the tile management system 102; rather, the request for the geospatial tile 108 can be sent to the tile management system 102 by a disparate device (e.g., a third party service, a disparate mobile device, a device temporarily coupled with the mobile device 104, etc.).

The mobile device 104 further includes a collection component 116 that receives the geospatial tile 108 from the tile management system 102 (e.g., sent by the delivery component 112). According to an example, the collection component 116 can receive the geospatial tile 108 when the mobile device 104 is positioned at a geographic location that is outside of a geographic region specified in the geospatial tile 108. In accordance with other examples, however, it is to be appreciated that the collection component 116 can receive the geospatial tile when the mobile device 104 is positioned at a geographic location that is within the geographic region specified in the geospatial tile 108 (e.g., a portion of the geospatial tile 108 can be retrieved over a cellular network connection, the entire geospatial tile 108 can be retrieved, etc.).

The mobile device 104 also includes a storage control component 118 that stores the geospatial tile 108 in a tile cache 120 of the mobile device 104 upon receipt from the tile management system 102. The storage control component 118 can manage retention and/or removal of geospatial tiles from the tile cache 120 (e.g., based upon age of the geospatial tiles, expiration of the geospatial tiles, available storage space, restrictions on removal, etc.). Moreover, the storage control component 118 can control updating of geospatial tiles stored in the tile cache 120 (e.g., upon expiration).

The mobile device 104 can also include a connection component 122 that can automatically connect the mobile device 104 to a particular Wi-Fi network (e.g., a Wi-Fi network 124) from the plurality of Wi-Fi networks specified in the geospatial tile 108 utilizing the data for the particular Wi-Fi network included in the geospatial tile stored in the tile cache 120. The connection component 122 can connect the mobile device 104 to the particular Wi-Fi network when the mobile device 104 is positioned within a geographic coverage area of the particular Wi-Fi network. According to an example, the connection component 122 can select to connect to the particular Wi-Fi network based upon detected signal strength, connection quality data specified in the geospatial tile 108, and so forth.

The following pseudo-code shows an example of a geospatial tile (e.g., the geospatial tile 108). It is to be appreciated that the below pseudo-code is provided for illustration purposes, and the claimed subject matter is not limited to this example.

```
"Tiles":[{
    "NWLatitude": Northwest latitude value for geospatial tile,
    "NWLongitude": Northwest longitude value for geospatial tile,
    "SELatitude": Southeast latitude value for geospatial tile,
    "SELongitude": Southeast longitude value for geospatial tile,
    "ValidTo": Date and time value at which the geospatial tile expires,
    "Networks":[{
        "Type": 3,
        "Ssid": "NETWORK 1"
        "Bssid": ["00:22:6b:44:dd:31"],
        "Score": 0.0,
        "DataCollectionNeeded": 1.0,
        "AutoConnectConfig": {
            "Security": 1,
            "Cipher": 0,
            "Psk": null,
            "Wpalds": null
        },
        "MobileOperators": null
    },
    {
        "Type": 3,
        "Ssid": "PARK"
        "Bssid": ["00:12:fb:c7:0a:0b"],
        "Score": 0.0,
        "DataCollectionNeeded": 1.0,
        "AutoConnectConfig": {
            "Security": 1,
            "Cipher": 0,
            "Psk": null,
            "Wpalds": null
        },
        "MobileOperators": null
    }],
    "IsPartial": false,
    "WifiPortalAssistants": [{
        "Id": ID number,
        "Instruction": Instruction set
    }]
}]
```

In the foregoing example, the geographic region specified in the geospatial tile is based on Northwest and Southeast coordinates (e.g., latitude and longitude values at the Northwest and the Southeast corners of the geographic region are specified in the geospatial tile). Moreover, the geospatial tile expires at the date and time value specified therein. Further, as noted above, the geospatial tile includes data for a plurality of Wi-Fi networks. The exemplary geospatial tile includes data for two Wi-Fi networks (e.g., NETWORK 1 and PARK); yet, it is to be appreciated that the claimed subject matter is not so limited. The data for each of the Wi-Fi networks in the above example includes an SSID, a BSSID, connection quality data (e.g., Score), and configuration information for automatic connection (e.g., AutoConnectConfig). Further, the exemplary geospatial tile includes a sequenced instruction set (e.g., Instruction set) for connecting to a captive portal network (e.g., identified by the ID number included in WifiPortalAssistants) and an indicator specifying whether the geospatial tile is partial.

According to another example, the delivery component 112 can infer a future geographic location of the mobile device 104. Following this example, the delivery component 112 can project the future geographic location of the mobile device 104 to be within a geographic region specified in the geospatial tile 108. Thus, the projected future geographic location of the mobile device 104 can be used to identify and retrieve the geospatial tile 108 from the data repository 106 for delivery to the mobile device 104. According to yet another example, it is contemplated that the delivery component 112 can use a cloud based inference service to deduce the future geographic location of the mobile device 104. Similar to above, the future geographic location of the mobile device 104 can be used by the delivery component 112 to identify, retrieve, and deliver the geospatial tile 108. Pursuant to the above examples, the collection component 116 can receive the geospatial tile 108 based upon the inferred future geographic location of the mobile device 104.

By way of yet another example, the mobile device 104 can use a device temporarily coupled therewith to generate requests for geospatial tiles from the tile management system 102 and/or receive the geospatial tiles from the tile management system 102. The device temporarily coupled with the mobile device 104, for instance, can be a non-volatile memory card (e.g., Secure Digital (SD) card, etc.), a temporary storage device coupled with the mobile device 104 via a proximity network, a smart card, or the like. Pursuant to an illustration, the device temporarily coupled with the mobile device 104, which can lack a data connection, can generate a request for the geospatial tile 108. The request can be executed by the request component 114 of the mobile device 104. The collection component 116 can receive the geospatial tile 108 from the tile management system 102, which can further be returned to the device temporarily coupled with the mobile device 104. According to another illustration, the device temporarily coupled with the mobile device 104 can manage the tile cache 120 remotely. For instance, a smart card coupled with the mobile device 104 can cause the tile cache 120 to remove local sensitive data when leaving a restricted area.

Figure 2:
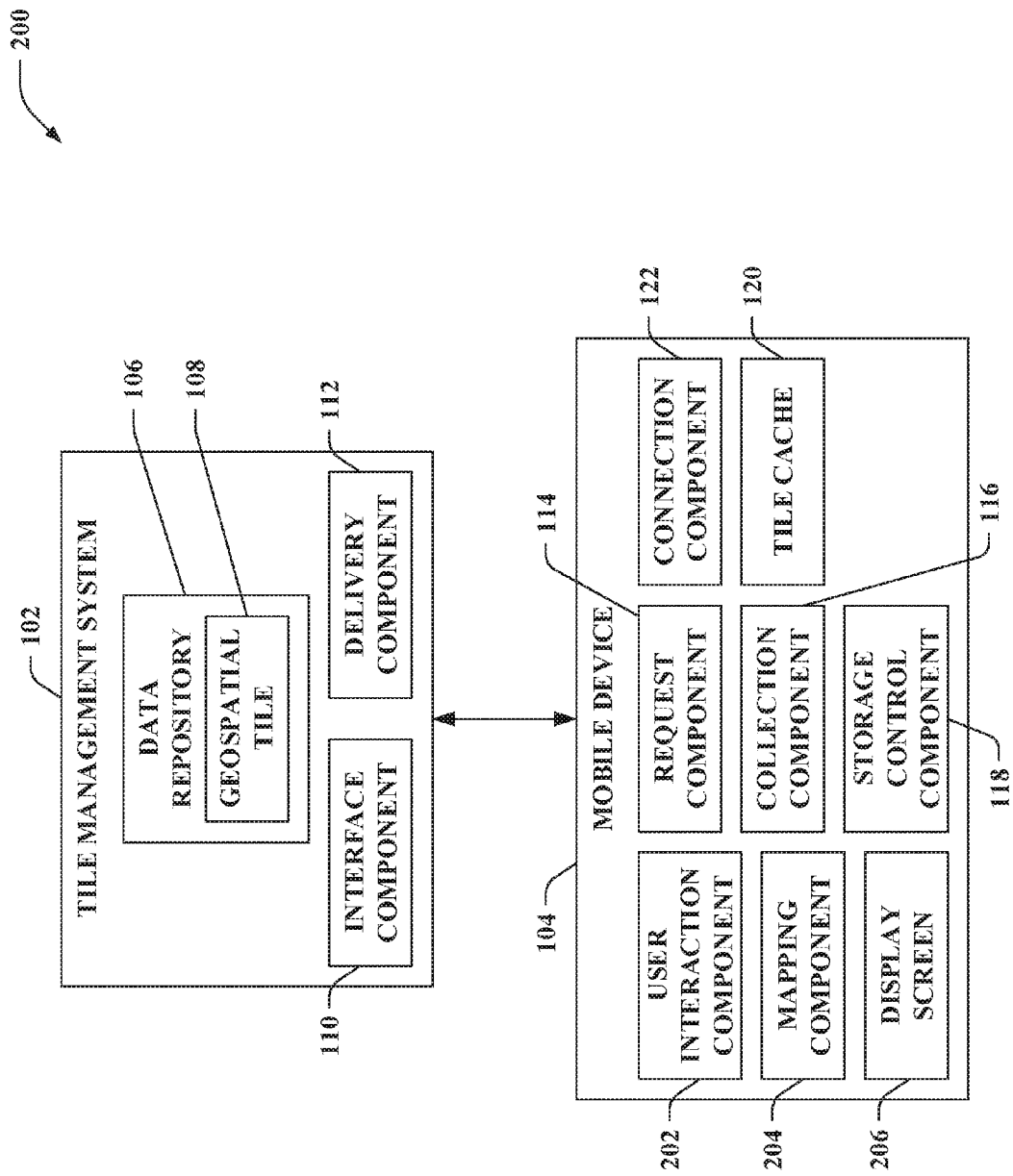
FIG. 2 illustrates a functional block diagram of an exemplary system that employs user input for controlling transfer of geospatial tiles from the tile management system to the mobile device and/or management of geospatial tiles retained in a tile cache of the mobile device.

With reference to FIG. 2, illustrated is a system 200 that employs user input for controlling transfer of geospatial tiles from the tile management system 102 to the mobile device 104 and/or management of geospatial tiles retained in the tile cache 120 of the mobile device 104. As depicted in FIG. 2, the mobile device 104 can include a user interaction component 202 that can receive user input. For example, the user input obtained by the user interaction component 202 can identify a desired geographic location, where the desired geographic location differs from a current geographic location at which the mobile device 104 is positioned. The desired geographic location, for instance, can be within the geographic region specified in the geospatial tile 108. Thus, geographic location information of the desired geographic location can be utilized as an indicator, which can be provided to the request component 114. Accordingly, the request component 114 can request the geospatial tile 108 from the tile management system 102 based upon the indicator that specifies the geographic location information of the desired geographic location as identified by the user interaction component 202.

The mobile device 104 can also include a mapping component 204 that displays a map on a display screen 206 of the mobile device 104. Accordingly, the user interaction component 202 can detect a selection of the desired geographic location on the map displayed on the display screen 206 by the mapping component 204. Thus, a user can specify the desired geographic location (e.g., a location to which the user is planning to travel, etc.) via the map displayed by the mapping component 204 on the display screen 206 to prime the tile cache 120 with the geospatial tile 108 that pertains to connectable Wi-Fi networks at such desired geographic location before visiting such geographic location. By way of illustration, the geospatial tile 108 can be obtained by the mobile device 104 for the desired geographic location prior to traveling to such desired geographic location. For instance, if the user is preparing to travel to Paris from Seattle, the user interaction component 202 can receive user input that identifies Paris as the desired geographic location while still in Seattle, thereby enabling the mobile device 104 to retrieve the geospatial tile 108 corresponding to Paris prior to departure.

While the aforementioned example describes the user interaction component 202 detecting the selection of the desired geographic location on the map displayed on the display screen 206 by the mapping component 204, it is to be appreciated that substantially any other sort of user input can be utilized to specify the desired geographic location. For instance, the user interaction component 202 can receive user input of a destination address to which the user is planning to travel. By way of another illustration, it is contemplated that the user input that specifies the desired geographic location received by the user interaction component 202 can be obtained via a voice-controlled digital assistant of the mobile device 104.

According to another example, the user interaction component 202 can receive user input that inhibits a geospatial tile (e.g., the geospatial tile 108) from being managed out of the tile cache 120 of the mobile device 104. Responsive to receipt of such user input, the storage control component 118 can continue to maintain the geospatial tile in the tile cache 120. Accordingly, the user of the mobile device 104 can lock in a small number of geospatial tiles into the tile cache 120 of the mobile device 104 so that such geospatial tiles are not managed out of the tile cache 120. Maintaining geospatial tile(s) in the tile cache 120 responsive to the user input can enable the user to take an active role in management of the geospatial tiles retained in the tile cache 120 of the mobile device 104, thereby enhancing the auto-connect experience for places that are visited on an infrequent basis, without the need to reload the geospatial tile. According to an illustration, the user interaction component 202 can receive user input that inhibits a geospatial tile corresponding to a user's grandmother's house in Florida from being managed out of the tile cache 120; following this illustration, while the user may visit her grandmother's house once a year, the corresponding geospatial tile can be maintained in the tile cache 120. While maintained in the tile cache 120, it is contemplated that the storage control component 118 can periodically cause the geospatial tile to be updated.

Various sources of the user input received by the user interaction component 202 are intended to fall within the scope of the hereto appended claims. For instance, the user input can be accepted via a button, switch, touchscreen, camera, keyboard, microphone, sensor, or other input device of the mobile device 104 or coupled to the mobile device 104. The mobile device 104 can employ voice and/or speech recognition, touch and/or stylus recognition, gesture recognition (e.g., on screen and/or adjacent to the screen), head and eye tracking, or the like to obtain the user input. By way of example, the user input can be obtained via a voice-controlled digital assistant of the mobile device 104; however, the claimed subject matter is not so limited.

Figure 3:
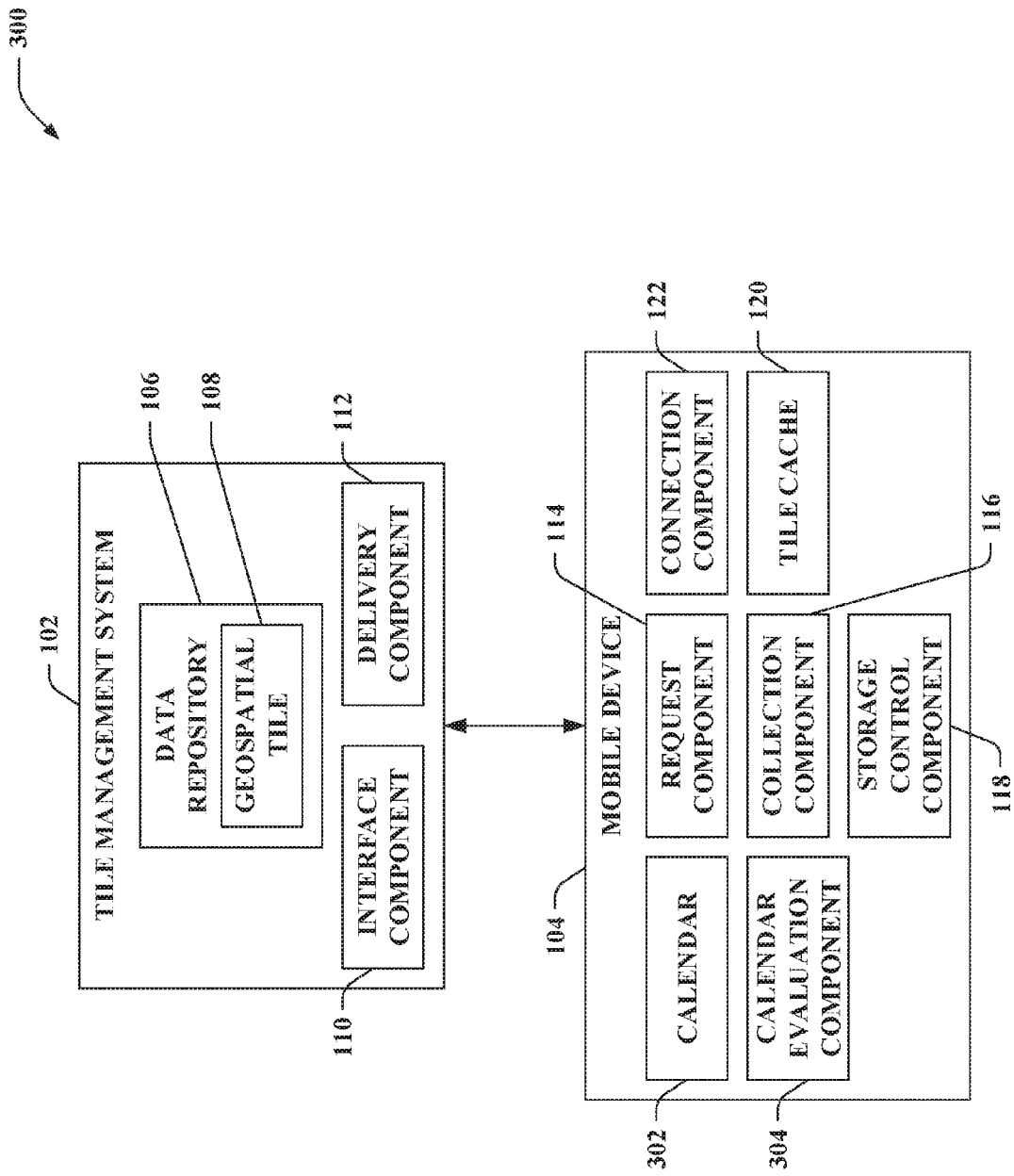
FIG. 3 illustrates a functional block diagram of an exemplary system that transfers geospatial tiles from the tile management system to the mobile device based upon location information associated with calendar items from a calendar of a user of the mobile device.

Now turning to FIG. 3, illustrated is a system 300 that transfers geospatial tiles from the tile management system 102 to the mobile device 104 based upon location information associated with calendar items from a calendar 302 of a user of the mobile device 104. Examples of calendar items include meetings, appointments, tasks, or the like. The mobile device 104 can include a calendar evaluation component 304 that can evaluate the calendar 302 of the user of the mobile device 104. For instance, the calendar evaluation component 304 can detect geographic location information for a future calendar item from the calendar 302 of the user of the mobile device 104. Further, the geographic location information detected from the future calendar item can be an indicator corresponding to a geospatial tile (e.g., the geospatial tile 108) for retrieval by the mobile device 104. Accordingly, the request component 114 can request the geospatial tile from the tile management system 102 based upon the geographic location information detected from the future calendar item by the calendar evaluation component 304.

The calendar evaluation component 304 can analyze the calendar 302 and use future calendar items to download geospatial tiles based on the schedule of the user (e.g., the future calendar items) and geographic location information corresponding to the future calendar items (e.g., specified in a location field of the calendar item). For instance, a future calendar item can specify that the user has a lunch meeting at a café in downtown Phoenix. Thus, the calendar evaluation component 304 can evaluate the future calendar item and cause the request component 114 to request a geospatial tile that includes the location of the café in downtown Phoenix.

According to an example, the mobile device 104 can request the geospatial tile from the tile management system 102 a predetermined period of time prior to the future calendar item from the calendar 302 of the user of the mobile device 104. Following this example, the request component 114 can identify whether the mobile device 104 has an established Wi-Fi connection at the predetermined period of time prior to the future calendar item. When the mobile device 104 is determined to have the established Wi-Fi connection at the predetermined period of time prior to the future calendar item, the request component 114 can initiate the requesting of the geospatial tile 108 from the tile management system 102 over the established Wi-Fi connection. Alternatively, when the mobile device 104 is determined to lack the established Wi-Fi connection at the predetermined period of time prior to the future calendar item, the request component 114 can thereafter identify whether the mobile device 104 subsequently establishes a Wi-Fi connection at a time before the future calendar item. Upon identifying the subsequent establishment of the Wi-Fi connection at the time before the future calendar item, the request component 114 can initiate the requesting of the geospatial tile from the tile management system 102 over the Wi-Fi connection. If the request component 114 determines that a Wi-Fi connection is not subsequently established at a time before the future calendar item, then the request component 114 can initiate requesting the geospatial tile over a cellular network connection. However, it is also contemplated that the request component 114 can request a portion of the geospatial tile 108 over the cellular network connection, where such portion can be utilized to establish a Wi-Fi connection upon the mobile device 104 being positioned within respective geographic coverage areas of Wi-Fi networks included in the portion of the geospatial tile 108. Thereafter, a remainder of the geospatial tile 108 can be obtained over an established Wi-Fi connection, thereby reducing an amount of data exchanged over the cellular network connection.

Moreover, it is contemplated that a calendar item for the calendar 302 of the user of the mobile device 104 can include a geospatial tile. Data of the geospatial tile can be directly included in the calendar item or virtually included as a pointer. For instance, the mobile device 104 can receive a calendar item for the calendar 302 of the user of the mobile device 104, where the calendar item includes the geospatial tile 108 (e.g., the data of the geospatial tile 108 can be included with the calendar item) or a pointer to the geospatial tile 108. If the calendar item includes the pointer to the geospatial tile 108, then the request component 114 can request the geospatial tile 108 from the tile management system 102 based upon the pointer to the geospatial tile 108. Similar to above, it is to be appreciated that the geospatial tile 108 can be requested from the tile management system 102 based upon the pointer at a predetermined period of time prior to the calendar item (e.g., over an established Wi-Fi connection, etc.).

Figure 4:
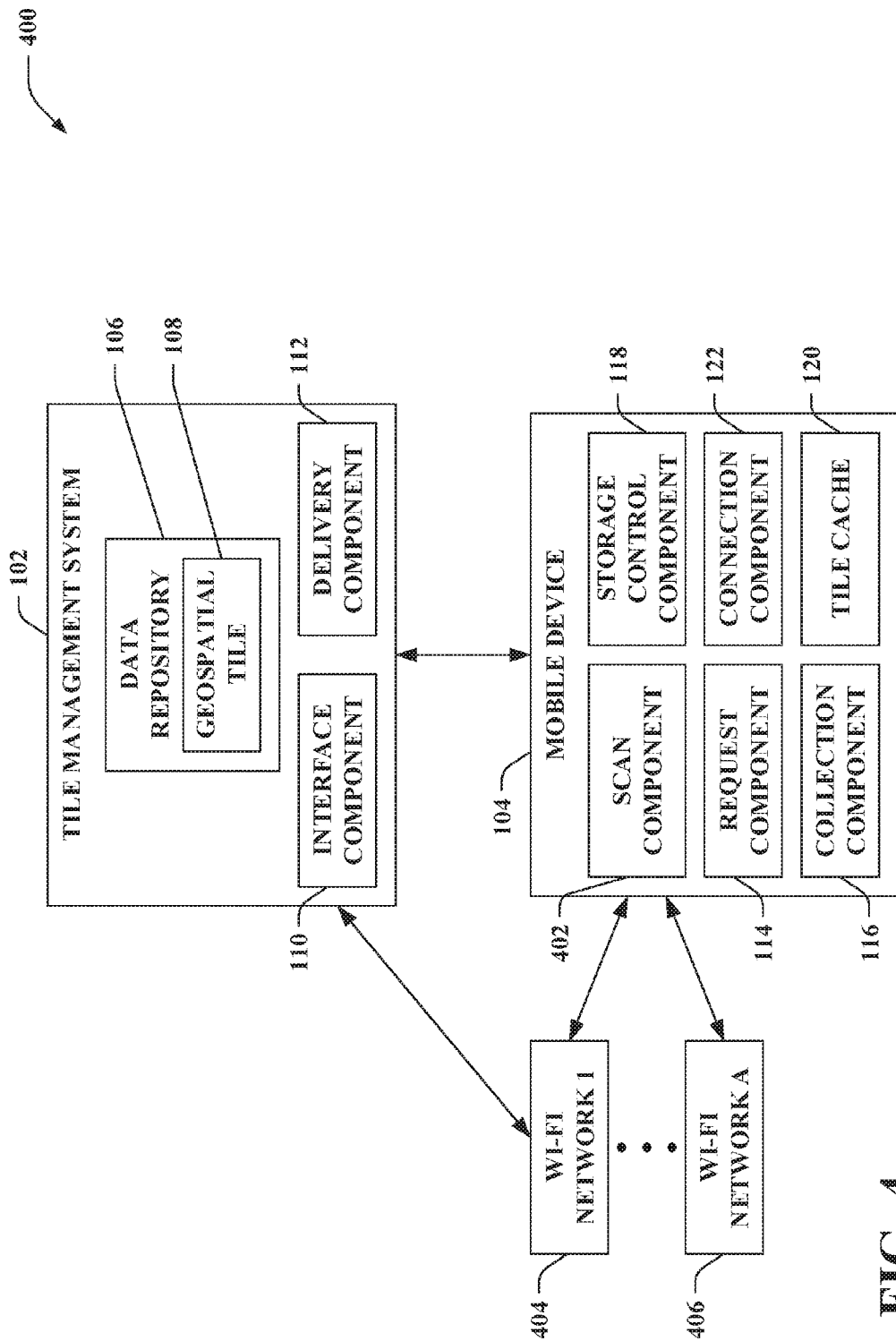
FIG. 4 illustrates a functional block diagram of an exemplary system that transfers a portion of a geospatial tile from the tile management system to the mobile device via a cellular network connection and a remainder of the geospatial tile upon the mobile device connecting to a Wi-Fi network.

Turning now to FIG. 4, illustrated is a system 400 that transfers a portion of a geospatial tile (e.g., the geospatial tile 108) from the tile management system 102 to the mobile device 104 via a cellular network connection and a remainder of the geospatial tile upon the mobile device 104 connecting to a Wi-Fi network. The mobile device 104 includes a scan component 402 that scans for Wi-Fi networks within geographic proximity of the mobile device 104. The mobile device 104 can lack an established Wi-Fi connection at a current geographic location at which the mobile device 104 is positioned (e.g., when the scan component 402 scans for the Wi-Fi networks). For instance, the scan component 402 can detect a Wi-Fi network 1 404, . . . , and a Wi-Fi network A 406 within geographic proximity of the mobile device 104, where A can be substantially any integer greater than one; however, it is also contemplated that the scan component 402 can detect zero or one Wi-Fi network within geographic proximity of the mobile device 104.

The request component 114 of the mobile device 104 can send a list of detected Wi-Fi networks within geographic proximity of the mobile device 104 to the tile management system 102 over a cellular network connection. The interface component 110 of the tile management system 102 can receive the list of detected Wi-Fi networks, and the delivery component 112 can send a portion of the geospatial tile 108 from the tile management system 102 to the mobile device 104. Further, the collection component 116 can receive the portion of the geospatial tile 108 from the tile management system 102 via the cellular network connection. The portion of the geospatial tile 108 can include an SSID, a BSSID, and configuration information for automatically connecting the mobile device 104 to a given detected Wi-Fi network included in the list of detected Wi-Fi networks (e.g., the Wi-Fi network 1 404). Moreover, it is contemplated that the portion of the geospatial tile 108 received by the collection component 116 can include SSID(s), BSSID(s), and configuration information for automatically connecting the mobile device 104 to other detected Wi-Fi network(s) included in the list of detected Wi-Fi networks sent to the tile management system 102 by the request component 114. The storage control component 118 can further retain the portion of the geospatial tile 108 received from the tile management system 102 in the tile cache 120.

Moreover, the connection component 122 can connect the mobile device 104 to the given detected Wi-Fi network. As illustrated, the connection component 122 can automatically connect the mobile device 104 to the Wi-Fi network 1 404. Further, the collection component 116 can receive a remainder of the geospatial tile 108 upon connecting to the given detected Wi-Fi network. Thus, upon connecting to the Wi-Fi network 1 404, the request component 114 can request the remainder of the geospatial tile 108 from the tile management system 102. The interface component 110 of the tile management system 102 can receive the request for the remainder of the geospatial tile 108 and the delivery component 112 can send the remainder of the geospatial tile 108 to the mobile device 104. Thus, the collection component 116 can receive the remainder of the geospatial tile 108 via the Wi-Fi network 1 404. Accordingly, the system 400 can enable reducing an amount of data exchanged over the cellular network connection when the geospatial tile 108 is not pre-populated in the tile cache 120 prior to the mobile device 104 being positioned within a geographic region specified in the geographic tile 108.

Figure 5:
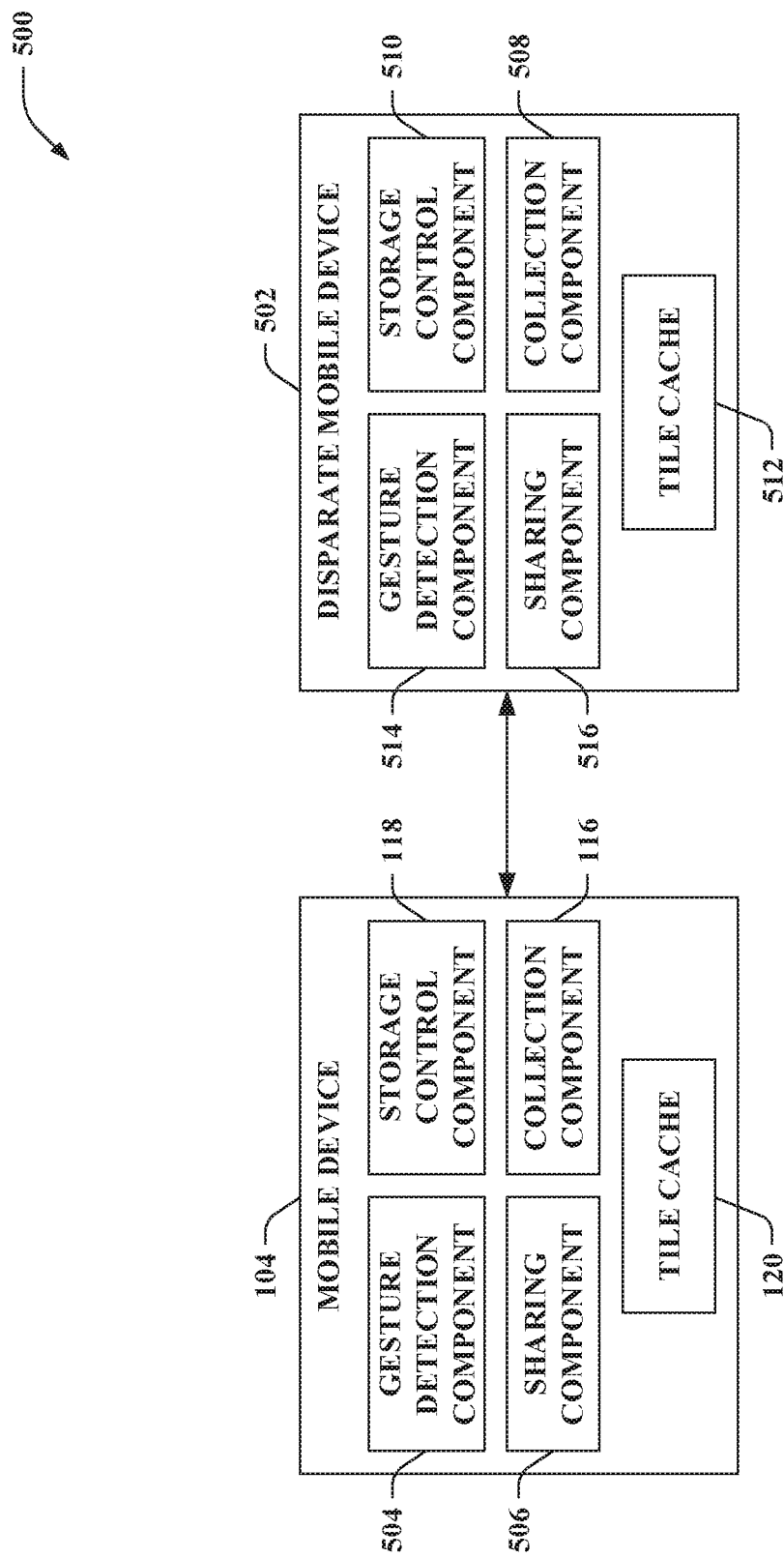
FIG. 5 illustrates a functional block diagram of an exemplary system that enables sharing geospatial tiles between mobile devices.

With reference to FIG. 5, illustrated is a system 500 that enables sharing geospatial tiles between mobile devices. The system 500 includes the mobile device 104 and a disparate mobile device 502. The mobile device 104 can include the collection component 116, the storage control component 118, and the tile cache 120. Further, the mobile device 104 includes a gesture detection component 504 that can detect a physical gesture between the mobile device 104 and the disparate mobile device 502. It is contemplated that substantially any type of physical gesture can be detected by the gesture detection component 504 (e.g., a tap, multiple taps, the mobile device 104 and the disparate mobile device 502 being within proximity of each other, etc.). The mobile device 104 can also include a sharing component 506 that can authenticate the disparate mobile device 502. The authentication can be effectuated based upon a relationship between users of the mobile device 104 and the disparate mobile device 502. For instance, if a user of the mobile device 104 is part of a tile sharing network, then the sharing component 506 can determine whether a user of the disparate mobile device 502 is also part of the tile sharing network; however, the claimed subject matter is not so limited. Moreover, responsive to detection of the physical gesture and authentication of the disparate mobile device 502, the sharing component 506 can send a geospatial tile stored in the tile cache 120 of the mobile device 104 to the disparate mobile device 502.

Moreover, the disparate mobile device 502 can be substantially similar to the mobile device 104. Accordingly, the disparate mobile device 502 can include a collection component 508, a storage control component 510, a tile cache 512, a gesture detection component 514, and a sharing component 516, which can respectively be substantially similar to the collection component 116, the storage control component 118, the tile cache 120, the gesture detection component 504, and the sharing component 506 of the mobile device 104. Thus, the mobile device 104 can receive a geospatial tile from the disparate mobile device 502. More particularly, the gesture detection component 514 can detect a physical gesture between the mobile device 104 and the disparate mobile device 502. Further, the sharing component 516 can authenticate the mobile device 104. The sharing component 516 can send the geospatial tile stored in the tile cache 512 to the mobile device 104. Accordingly, the collection component 116 of the mobile device 104 can receive the geospatial tile from the disparate mobile device 502 (e.g., the geospatial tile is received over a proximity network) and the storage control component 118 can store the geospatial tile in the tile cache 120 of the mobile device 104.

According to an example, the disparate mobile device 502 can retain geospatial tiles for downtown Seattle in the tile cache 512. A user of the mobile device 104 can plan to travel to downtown Seattle; however, the tile cache 120 of the mobile device 104 may lack the geospatial tiles for downtown Seattle (e.g., the user of the mobile device 104 may or may not have previously visited downtown Seattle, the tile cache 120 may include other geospatial tiles for downtown Seattle, etc.). Accordingly, a physical gesture between the mobile device 104 and the disparate mobile device 502 can be effectuated. Moreover, such physical gesture can be detected by the gesture detection component 514 of the disparate mobile device 502. Responsive thereto, the sharing component 516 can cause the geospatial tiles for downtown Seattle to be sent to the mobile device 104.

It is contemplated that the sharing component 516 of the disparate mobile device 502 can directly send a geospatial tile to the mobile device 104 in a peer-to-peer manner. For instance, the geospatial tile can be sent from the mobile device 502 to the mobile device 104 over a proximity network (e.g., Bluetooth, near field communication (NFC), a Wi-Fi network to which both mobile devices are concurrently connected, etc.). According to another example, the sharing component 516 can transfer a token to the mobile device 104, which can enable the mobile device 104 to retrieve the geospatial tile shared by the disparate mobile device 502 (e.g., the token can be employed by the request component 114 of the mobile device 104 to retrieve the geospatial tile from the tile management system 102). Following this example, the token can be sent from the mobile device 502 to the mobile device 104 over a proximity network. By way of yet another example, the sharing component 516 can provide a token to a tile management system (e.g., the tile management system 102); following this example, the token can be received by the interface component 110 and can cause the delivery component 112 to send the geospatial tile to the mobile device 104. Moreover, it is contemplated that the foregoing examples can be extended to the sharing component 506 of the mobile device 104.

The system 500 can be employed to swap tile coverage between the mobile device 104 and the disparate mobile device 502. Moreover, the system 500 can be employed to enable the mobile device 104 and the disparate mobile device 502 to exchange updated geospatial tiles for different areas. Accordingly, the mobile device 104 can refresh a geospatial tile retained in the tile cache 512 of the disparate mobile device 502 (e.g., if the mobile device 104 has a more recent version of the geospatial tile), and vice versa.

Figure 6:
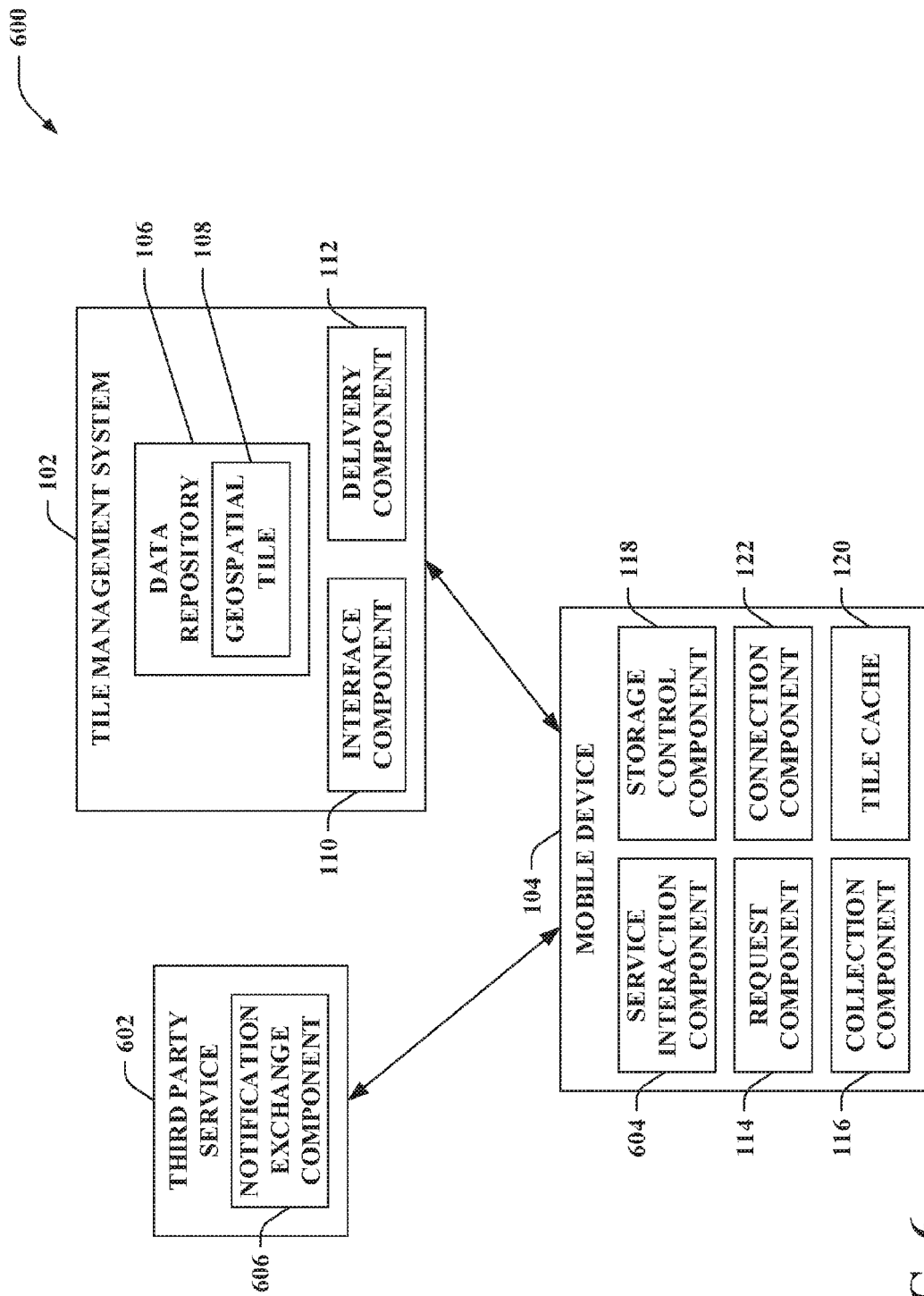
FIG. 6 illustrates a functional block diagram of an exemplary system that utilizes a notification received by the mobile device from a third party service to initiate requesting a geospatial tile from the tile management system.

With reference to FIG. 6, illustrated is a system 600 that utilizes a notification received by the mobile device 104 from a third party service to initiate requesting a geospatial tile (e.g., the geospatial tile 108) from the tile management system 102. The system 600 includes the tile management system 102, the mobile device 104, and a third party service 602. Examples of the third party service 602 include a travel booking service, a social networking service, a social planning service for creating, sending and managing online invitations, a ticket purchasing service, a ticket management service, or the like.

The mobile device 104 includes a service interaction component 604 that can accept an event through the third party service 602 (e.g., accept an invitation, purchase a ticket for an event, etc.). The third party service 602 can further include a notification exchange component 606 that sends a notification concerning the event accepted through the third party service 602 to the mobile device 104.

The notification (e.g., indicator) concerning the event can be obtained by the mobile device 104 from the third party service 602 (e.g., via the service interaction component 604). The request component 114 of the mobile device 104 can receive the notification concerning the event accepted through the third party service 602. Moreover, the request component 114 can request the geospatial tile 108 from the tile management system 102 based upon the notification concerning the event accepted through the third party service 602.

According to other examples, the third party service 602 can be a search engine, a mapping service, or the like. The service interaction component 604 can be employed to interact with the third party service 602. Responsive to the interaction, the notification exchange component 606 can send an indicator to the mobile device 104, where the indicator corresponds to the geospatial tile 108. Thus, the request component 114 can request the geospatial tile 108 from the tile management system 102 based upon the indicator received from the third party service 602.

By way of illustration where the third party service 602 is a mapping service, the service interaction component 602 can be used with the mapping service to view a map on a display screen of the mobile device 104. The notification exchange component 606 can implicitly identify the geospatial tile 108 for prefetching by the mobile device 104 (e.g., based upon a geographic location on the map viewed via the mapping service, a search for a geographic location performed via the mapping service, etc.). Responsive to the implicit identification, the notification exchange component 606 can send the indicator corresponding to the geospatial tile 108 to the mobile device 104, and the request component 114 can request the geospatial tile 108 based upon the indicator. Additionally or alternatively, explicit input can be provided by the service interaction component 604 to the third party service 602 identifying the geospatial tile 108 for prefetching by the mobile device 104 (e.g., the explicit input can specify that obtaining a geospatial tile that covers the displayed geographic region on the map is desired). Accordingly, the notification exchange component 606 can send the indicator corresponding to the geospatial tile 108 to the mobile device 104. It is contemplated, for instance, that a geospatial tile that is obtained by the mobile device 104 based upon implicit action (e.g., interaction of the mobile device 104 with the third party service 602 observed by the notification exchange component 606) can have a shorter time to live (TTL) than a geospatial tile obtained by the mobile device 104 based upon explicit input provided to the third party service 602 (or other data such as presence, calendar items, acceptance of an event, etc.).

Turning to FIG. 7, illustrated is another exemplary system 700 that employs notifications from the third party service 602 to cause a geospatial tile (e.g., the geospatial tile 108) to be sent to the mobile device 104 from the tile management system 102. Again, the mobile device 104 can include the service interaction component 604, which can accept an event through the third party service 602 or otherwise interact with the third party service 602. In the example set forth in FIG. 7, the notification exchange component 606 of the third party service 602, responsive to acceptance of the event through the third party service 602, can send a request (e.g., a notification) to the tile management system 102 for delivery of the geospatial tile 108 to the mobile device 104. Thus, the interface component 110 of the tile management system 102 can receive the request for delivery of the geospatial tile 108 to the mobile device 104 directly from the third party service 602. Responsive to receipt of the request from the third party service 602, the delivery component 112 of the tile management system 102 can send the geospatial tile 108 to the mobile device 104. Accordingly, the geospatial tile 108 can be received by the collection component 116 and stored in the tile cache 120 by the storage control component 118.

Figure 8:
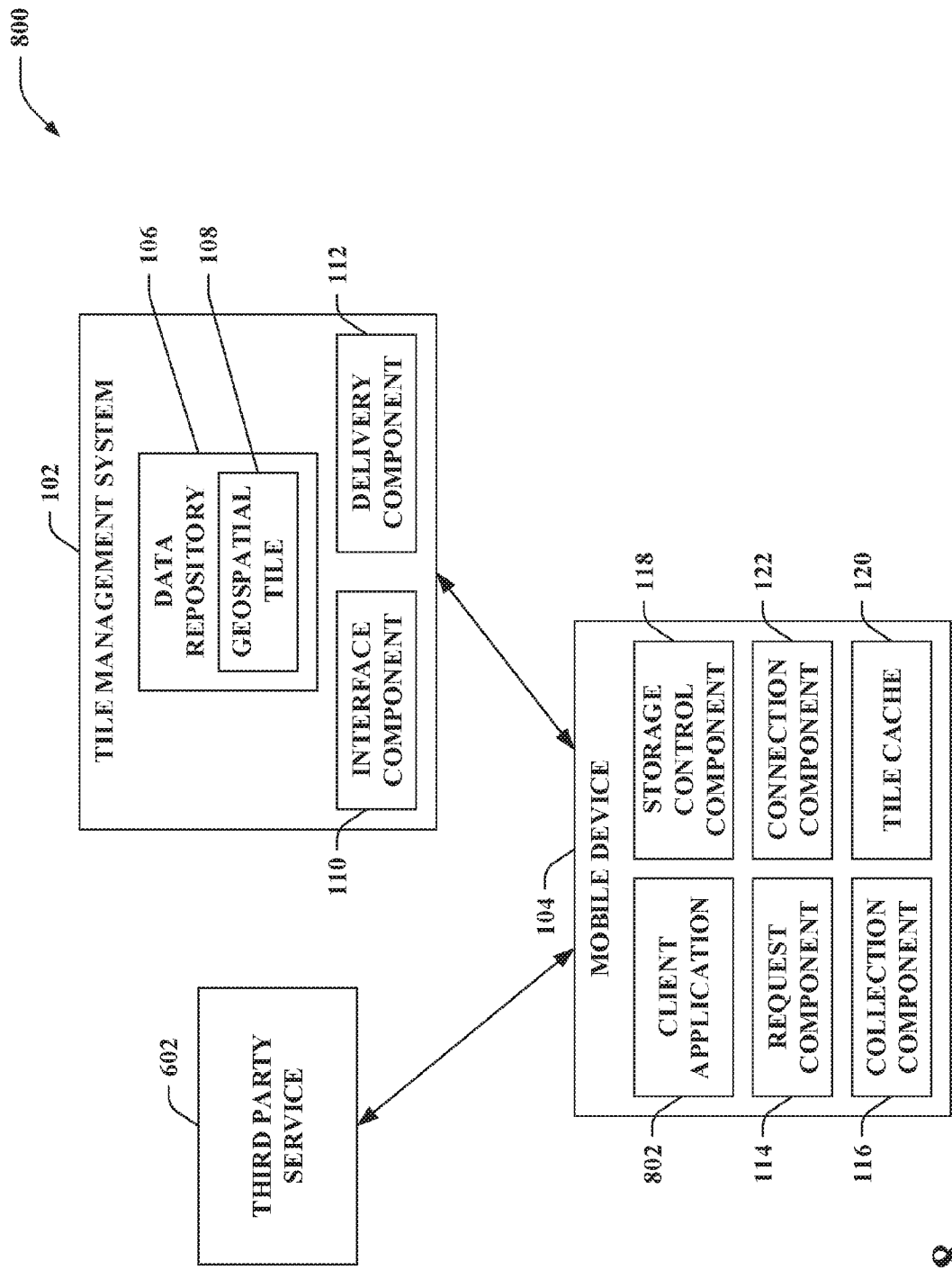
FIG. 8 illustrates a functional block diagram of an exemplary system that employs a client application that can initiate sending a request for a geospatial tile to the tile management system.

Now turning to FIG. 8, illustrated is a system 800 that employs a client application 802 that can initiate sending a request for a geospatial tile (e.g., the geospatial tile 108) to the tile management system 102. The mobile device 104 can execute the client application 802 for the third party service 602 on the mobile device 104. For example, an event can be accepted utilizing the client application 802 executed on the mobile device 104. Thus, a notification can be received by the request component 114 from the client application 802 executed on the mobile device 104. Further, the request component 114 can request the geospatial tile 108 from the tile management system 102 based upon the notification concerning the event accepted through the third party service 602 utilizing the client application 802. Additionally or alternatively, it is contemplated that the client application 802 can be a location aware application residing on the mobile device 104, where the location aware application can cause the request component 114 to send the request for the geospatial tile 108 to the tile management system 102.

Figure 9:
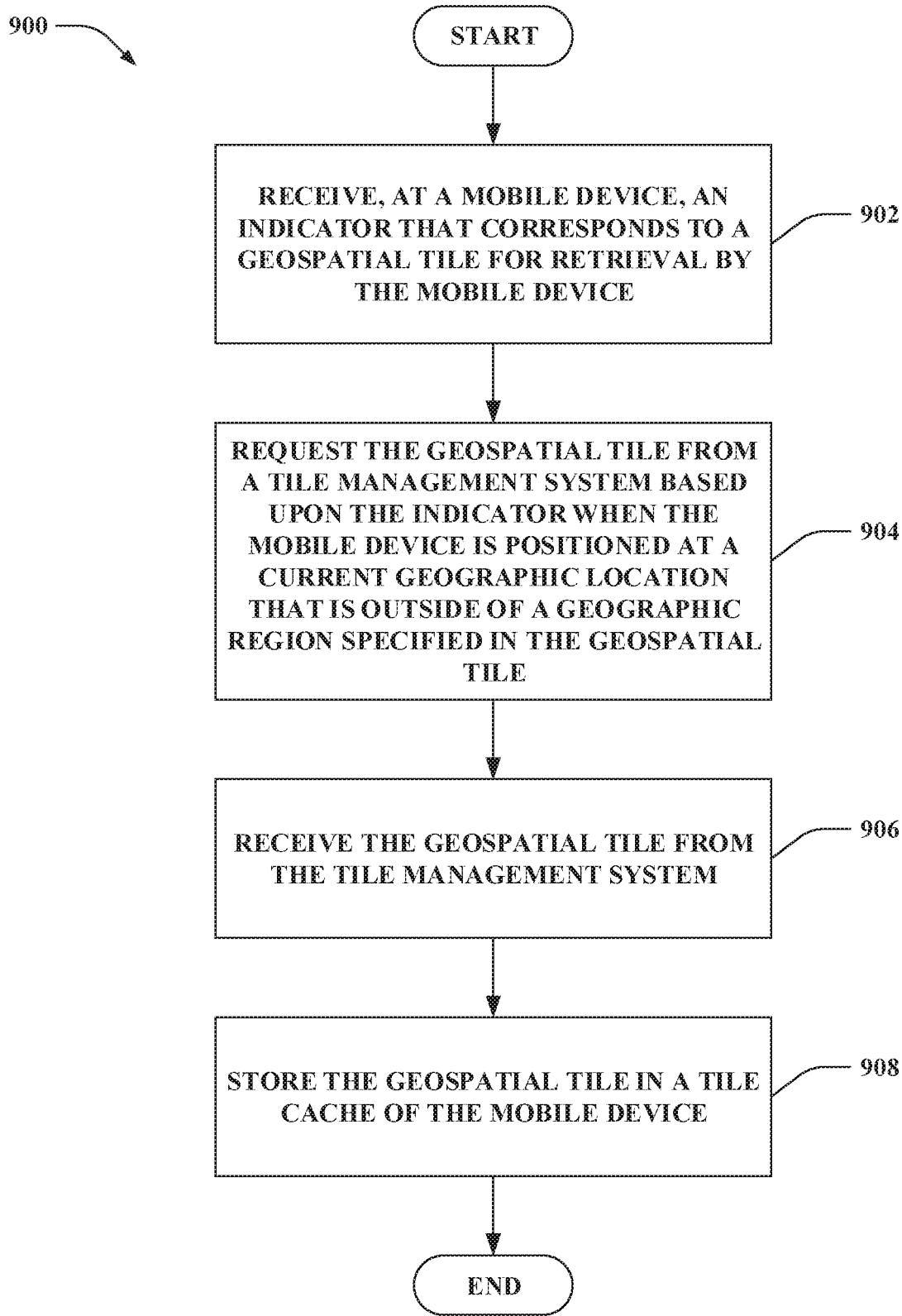
FIG. 9 is a flow diagram that illustrates an exemplary methodology executed by a mobile device for retrieving a geospatial tile.
Figure 10:
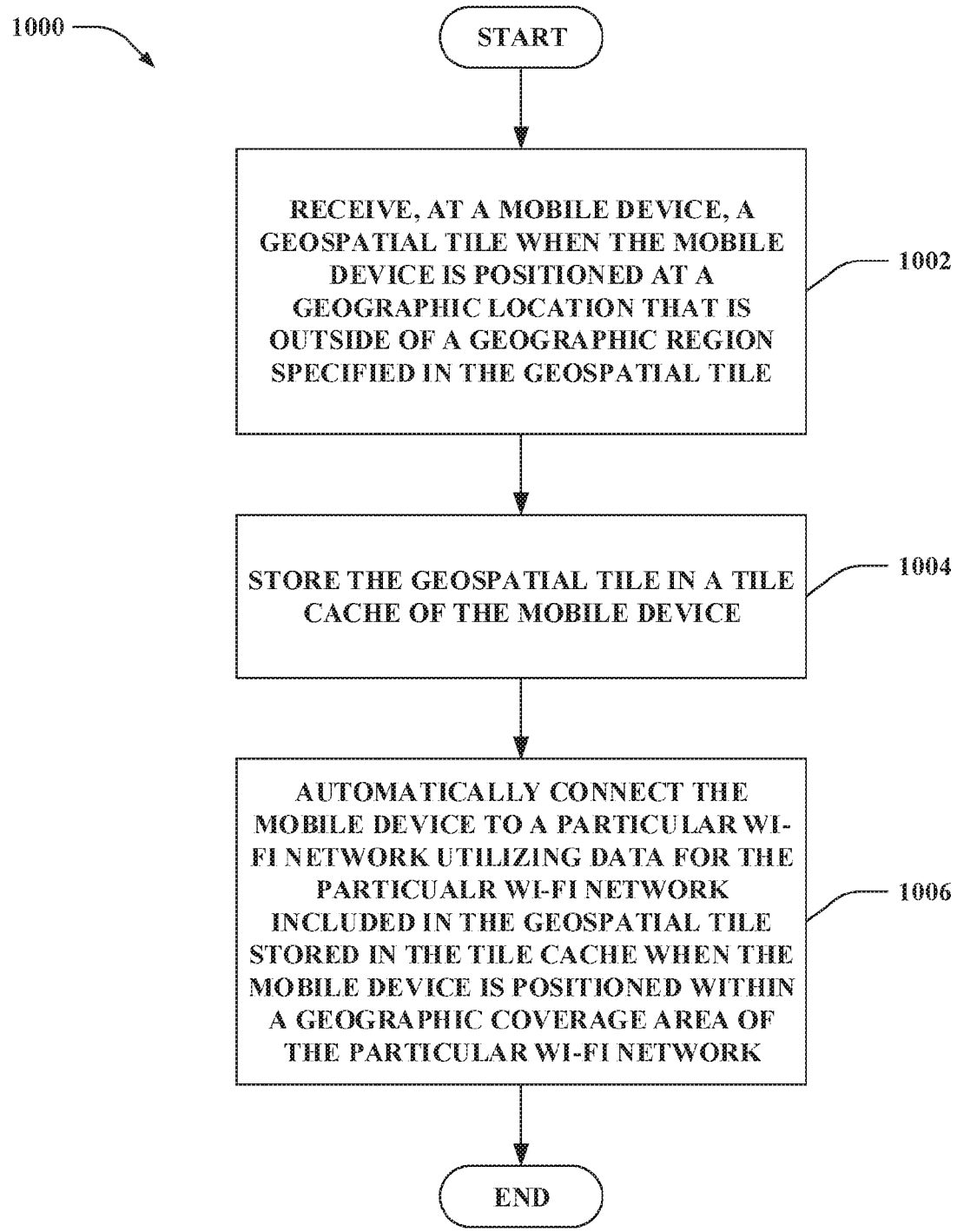
FIG. 10 is a flow diagram that illustrates an exemplary methodology executed by a mobile device for retrieving a geospatial tile.
Figure 11:
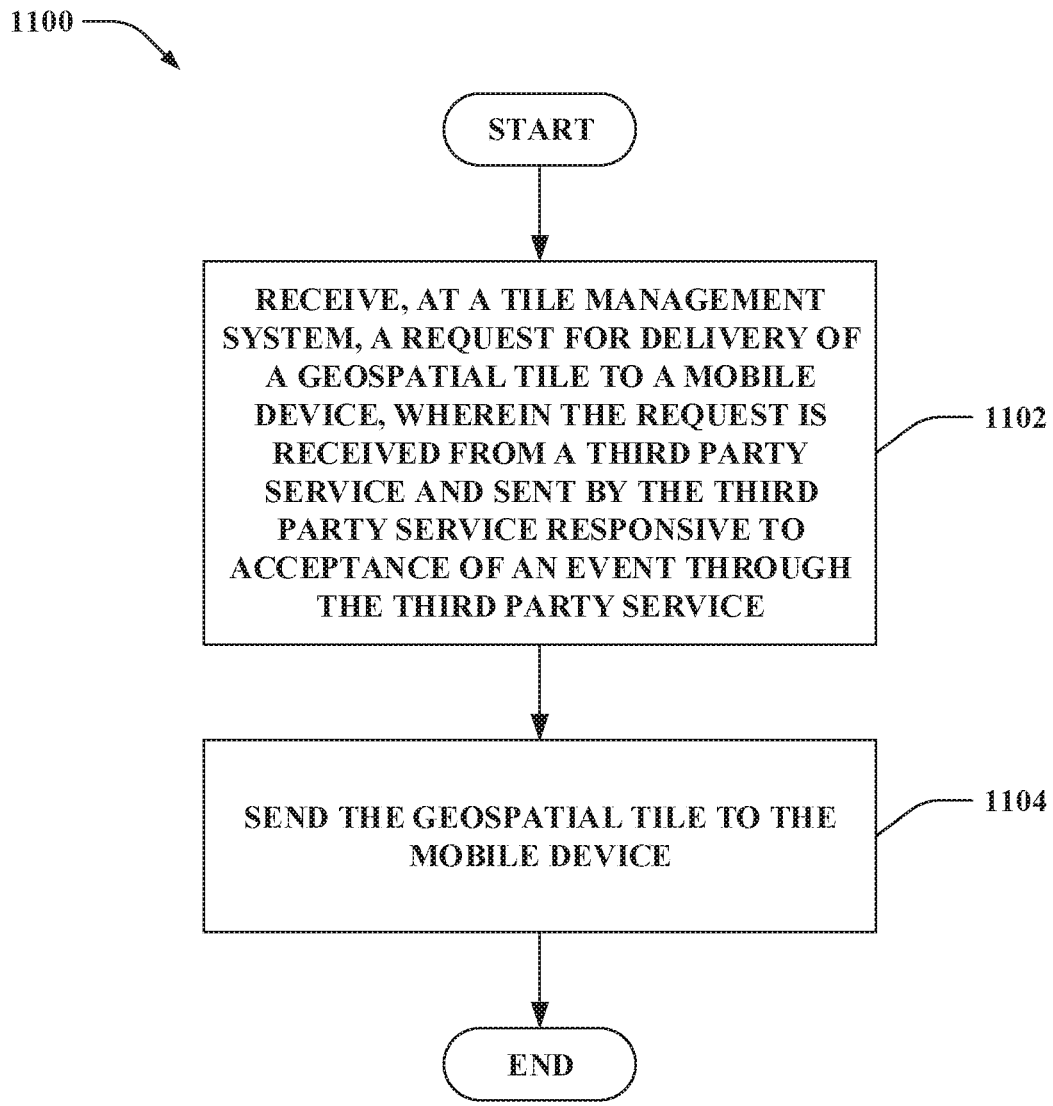
FIG. 11 is a flow diagram that illustrates an exemplary methodology for delivering a geospatial tile to a mobile device from a tile management system.

FIGS. 9-11 illustrate exemplary methodologies relating to transferring a geospatial tile. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 9 illustrates a methodology 900 executed by a mobile device for retrieving a geospatial tile. At 902, an indicator that corresponds to a geospatial tile for retrieval by the mobile device can be received at the mobile device. At 904, the geospatial tile can be requested from a tile management system based upon the indicator. The geospatial tile can be requested when the mobile device is positioned at a current geographic location that is outside of a geographic region specified in the geospatial tile. At 906, the geospatial tile can be received from the tile management system. At 908, the geospatial tile can be stored in a tile cache of the mobile device.

Turning to FIG. 10, illustrated is another methodology 1000 executed by a mobile device for retrieving a geospatial tile. At 1002, a geospatial tile can be received at the mobile device when the mobile device is positioned at a geographic location that is outside of a geographic region specified in the geospatial tile. At 1004, the geospatial tile can be stored in a tile cache of the mobile device. At 1006, the mobile device can automatically connect to a particular Wi-Fi network utilizing data for the particular Wi-Fi network included in the geospatial tile stored in the tile cache when the mobile device is positioned within a geographic coverage area of the particular Wi-Fi network.

Referring now to FIG. 11, illustrated is a methodology 1100 for delivering a geospatial tile to a mobile device from a tile management system. At 1102, a request for delivery of a geospatial tile to a mobile device can be received at the tile management system. The request can be received from a third party service, for example. Following this example, the request can be sent by the third party service responsive to acceptance of an event through the third party service. At 1104, the geospatial tile can be sent to the mobile device.

Figure 12:
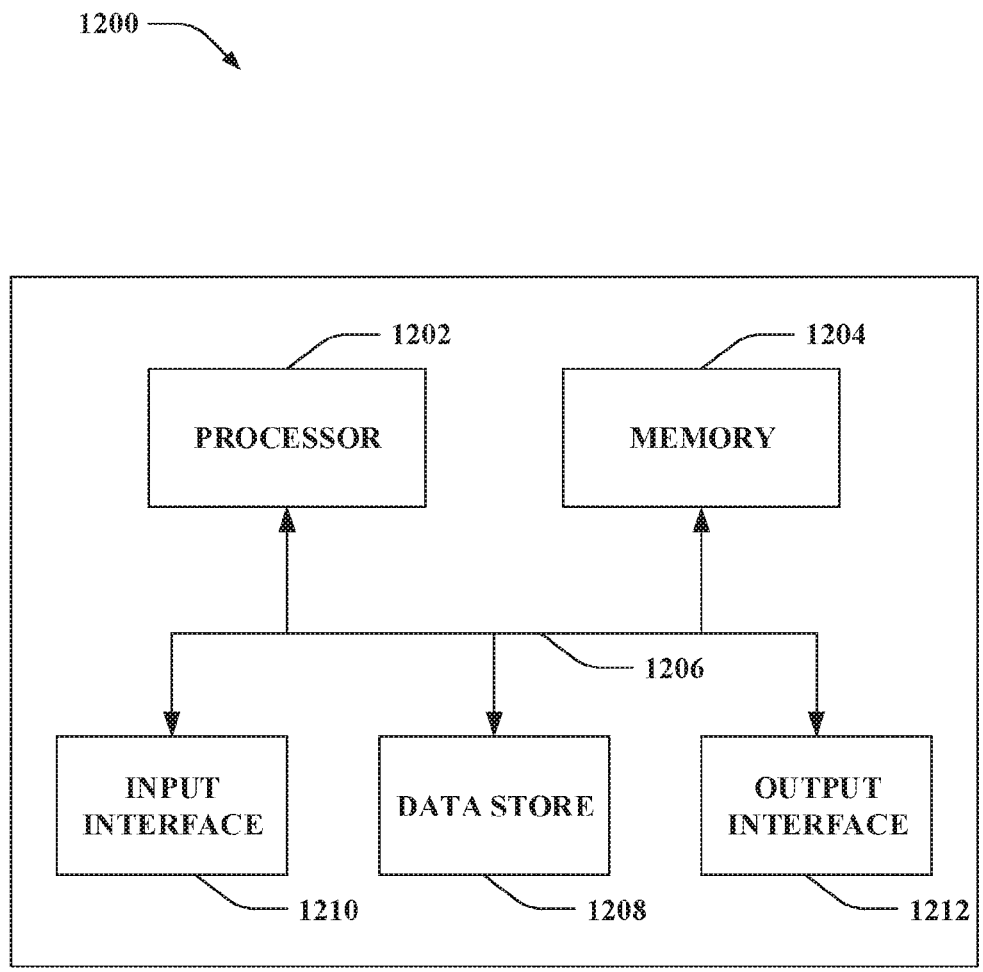
FIG. 12 illustrates an exemplary computing device.

Referring now to FIG. 12, a high-level illustration of an exemplary computing device 1200 that can be used in accordance with the systems and methodologies disclosed herein is illustrated. For instance, the computing device 1200 may be a mobile device (e.g., the mobile device 104, the disparate mobile device 502, etc.) that can request, retrieve, manage, and/or employ a geospatial tile. By way of another example, the computing device 1200 can be utilized in a tile management system (e.g., the tile management system 102) that delivers a geospatial tile to a mobile device. Pursuant to another example, a third party service (e.g., the third party service 602) can include the computing device 1200. The computing device 1200 includes at least one processor 1202 that executes instructions that are stored in a memory 1204. The instructions may be, for instance, instructions for implementing functionality described as being carried out by one or more components discussed above or instructions for implementing one or more of the methods described above. The processor 1202 may access the memory 1204 by way of a system bus 1206. In addition to storing executable instructions, the memory 1204 may also store geospatial tile(s), a calendar, a map, a list of detected Wi-Fi networks, and so forth.

The computing device 1200 additionally includes a data store 1208 that is accessible by the processor 1202 by way of the system bus 1206. The data store 1208 may include executable instructions, geospatial tile(s), a calendar, a map, a list of detected Wi-Fi networks, etc. The computing device 1200 also includes an input interface 1210 that allows external devices to communicate with the computing device 1200. For instance, the input interface 1210 may be used to receive instructions from an external computer device, from a user, etc. The computing device 1200 also includes an output interface 1212 that interfaces the computing device 1200 with one or more external devices. For example, the computing device 1200 may display text, images, etc. by way of the output interface 1212.

It is contemplated that the external devices that communicate with the computing device 1200 via the input interface 1210 and the output interface 1212 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1200 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1200 may be a distributed system. Thus, for instance, several devices may be in communication by way of a network connection and may collectively perform tasks described as being performed by the computing device 1200.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium.

Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A mobile device, comprising:
 a tile cache;
 at least one processor; and
 memory that comprises computer-executable instructions that, when executed by the at least one processor, cause the at least one processor to perform acts including:
  accepting an event;
  responsive to accepting the event, receiving a geospatial tile for the event, wherein the geospatial tile comprises data pertaining to a plurality of Wi-Fi networks having respective geographic coverage areas within a geographic region;
  storing the geospatial tile in the tile cache of the mobile device; and
  automatically connecting the mobile device to a particular Wi-Fi network from the plurality of Wi-Fi networks utilizing the data for the particular Wi-Fi network included in the geospatial tile stored in the tile cache when the mobile device is positioned within a geographic coverage area of the particular Wi-Fi network.

2. The mobile device of claim 1, wherein the geospatial tile further comprises coordinates of the geographic region.

3. The mobile device of claim 1, the geospatial tile being received when the mobile device is positioned outside of the geographic region.

4. The mobile device of claim 1, the event being accepted through a third party service.

5. The mobile device of claim 4, wherein the third party service sends a request to a tile management system for delivery of the geospatial tile to the mobile device responsive to acceptance of the event through the third party service.

6. The mobile device of claim 4, the memory further comprises computer-executable instructions that, when executed by the at least one processor, cause the at least one processor to perform acts including:
 receiving, from the third party service, a notification concerning the event accepted through the third party service; and
 requesting the geospatial tile from a tile management system utilizing the notification concerning the event accepted through the third party service.

7. The mobile device of claim 1, the event being accepted utilizing a client application executed on the mobile device, the client application being for a third party service.

8. The mobile device of claim 1, wherein, for each of the plurality of Wi-Fi networks, the data comprises:
 a service set identifier (SSID) for a Wi-Fi network;
 a basic service set identification (BSSID) for the Wi-Fi network; and
 configuration information for automatically connecting to the Wi-Fi network.

9. The mobile device of claim 1, wherein, for each of the plurality of Wi-Fi networks, the data comprises:
 connection quality data describing transmission and reception over a Wi-Fi network.

10. The mobile device of claim 1, wherein the plurality of Wi-Fi networks comprises at least one open, curated network, at least one captive portal network, and at least one shared Wi-Fi network.

11. The mobile device of claim 1, wherein the geospatial tile specifies a date and time value at which the geospatial tile expires.

12. The mobile device of claim 1, the memory further comprises computer-executable instructions that, when executed by the at least one processor, cause the at least one processor to perform acts including:
 receiving user input that locks the geospatial tile in the tile cache such that the geospatial tile is not managed out of the tile cache; and
 responsive to receipt of the user input, continuing to maintain the geospatial tile in the tile cache.

13. The mobile device of claim 1, the memory further comprises computer-executable instructions that, when executed by the at least one processor, cause the at least one processor to perform acts including:
 detecting a physical gesture between the mobile device and a disparate mobile device; and
 responsive to detection of the physical gesture, sending the geospatial tile stored in the tile cache to the disparate mobile device over a proximity network.

14. A method, comprising:
 accepting an event;
 receiving a geospatial tile at a mobile device, wherein the geospatial tile is for the event, wherein the geospatial tile is received responsive to acceptance of the event, and wherein the geospatial tile comprises data pertaining to a plurality of Wi-Fi networks having respective geographic coverage areas within a geographic region;
 storing the geospatial tile in a tile cache of the mobile device;
 receiving user input that locks the geospatial tile in the tile cache such that the geospatial tile is not managed out of the tile cache;
 responsive to receipt of the user input, continuing to maintain the geospatial tile in the tile cache; and
 automatically connecting the mobile device to a particular Wi-Fi network from the plurality of Wi-Fi networks utilizing the data for the particular Wi-Fi network included in the geospatial tile stored in the tile cache when the mobile device is positioned within a geographic coverage area of the particular Wi-Fi network.

15. The method of claim 14, further comprising:
 transmitting the geospatial tile to a disparate mobile device over a proximity network responsive to a physical gesture between the mobile device and the disparate mobile device.

16. The method of claim 14, wherein the geospatial tile further comprises coordinates of the geographic region, and the geospatial tile is received when the mobile device is positioned outside of the geographic region.

17. The method of claim 14, wherein the event is accepted though a third party service and is occurring within the geographic region.

18. A method, comprising:
 accepting an event;
 responsive to accepting the event, receiving a geospatial tile, wherein the geospatial tile is for the event, and wherein the geospatial tile comprises data pertaining to a plurality of Wi-Fi networks having respective geographic coverage areas within a geographic region;
 storing the geospatial tile in a tile cache of a mobile device; and
 automatically connecting the mobile device to a particular Wi-Fi network from the plurality of Wi-Fi networks utilizing the data for the particular Wi-Fi network included in the geospatial tile stored in the tile cache when the mobile device is positioned within a geographic coverage area of the particular Wi-Fi network.

19. The method of claim 18, further comprising:
 detecting a physical gesture between the mobile device and a disparate mobile device; and responsive to detection of the physical gesture, sending the geospatial tile stored in the tile cache of the mobile device to the disparate mobile device over a proximity network.

20. The method of claim 18, further comprising:

receiving user input that locks the geospatial tile in the tile cache such that the geospatial tile is not managed out of the tile cache; and responsive to receipt of the user input, continuing to maintain the geospatial tile in the tile cache.

* * * * *